US012782381B2

(12) United States Patent
Liu et al.

(10) Patent No.: US 12,782,381 B2
(45) Date of Patent: Nov. 3, 2026

(54) EMISSION FLOWMETER SYSTEM

(71) Applicant: EmMea Inc., Calgary (CA)

(72) Inventors: Willow Liu, Calgary (CA); Qi Jin, Calgary (CA)

(73) Assignee: EmMea Inc., Calgary (CA)

(*) Notice: Subject to any disclaimer, the term of this patent is extended or adjusted under 35 U.S.C. 154(b) by 419 days.

(21) Appl. No.: 18/596,836

(22) Filed: Mar. 6, 2024

(65) Prior Publication Data

US 2024/0318990 A1 Sep. 26, 2024

Related U.S. Application Data

(60) Provisional application No. 63/450,370, filed on Mar. 6, 2023.

(51) Int. Cl.
*G01P 13/04* (2006.01)
*G01F 1/86* (2006.01)

(52) U.S. Cl.
CPC .............. *G01P 13/045* (2013.01); *G01F 1/86* (2013.01)

(58) Field of Classification Search
CPC ................................ G01F 1/86; G01P 13/045
USPC ........................................................... 702/45
See application file for complete search history.

(56) References Cited

U.S. PATENT DOCUMENTS

| | | | | |
|---|---|---|---|---|
| 6,382,014 | B1 | 5/2002 | Breton | |
| 7,075,653 | B1 | 7/2006 | Rutherford | |
| 9,086,342 | B2 | 7/2015 | Miller | |
| 10,101,186 | B2 | 10/2018 | Pretre | |
| 10,690,562 | B2 | 6/2020 | Rieker | |
| 10,801,872 | B1 | 10/2020 | Beck | |
| 11,543,276 | B2 * | 1/2023 | Meribout | E21B 47/107 |
| 11,604,094 | B2 | 3/2023 | Scott | |
| 11,713,992 | B2 | 8/2023 | Layher | |
| 2017/0234707 | A1 * | 8/2017 | Breton | G01M 15/10 73/23.31 |

* cited by examiner

*Primary Examiner* — John H Le

(57) ABSTRACT

A system for measuring the emission mass flow rates of pollutants that uses a flow unit remote from the emission site and multiple layers of physics-informed neural networks, or PINN. The system allows for continuously monitoring, measuring, and quantifying of a variety of greenhouse gas (GHG) emissions (e.g. CH4, CH3Br, C2H6, C3H8, COx, NxO, SOx, SF6, H2, MOX, HCHO, VOC, and HC). The systems can include measuring the flow of GHG emissions that are emitted by, oil and gas facilities, industrial farming facilities, manufacturing facilities, waste management facilities, and high-density residential buildings/complexes and other locations of interest.

20 Claims, 9 Drawing Sheets

Expanded PINN

EMISSION FLOWMETER SYSTEM

CROSS-REFERENCES & RELATED APPLICATIONS

This application claims priority to U.S. Provisional Application No. 63/450,370 filed Mar. 6, 2023, and entitled "A new type of emissions detection and measurement system using multiphase flow analysis method" which is hereby incorporated by reference in its entirety under 35 U.S.C. § 119(e).

The present application claims priority to co-pending application Ser. No. 18/596,890 filed on the same day as the present application which is hereby incorporated by reference in its entirety.

TECHNICAL FIELD

The disclosed flow system relates generally to an apparatus and method of analysis for continuously monitoring, measuring, and quantifying of a variety of greenhouse gas (GHG) emissions (e.g. $CH_4$, $CH_3Br$, $C_2H_6$, $C_3H_8$, $CO_x$, $N_xO$, $SO_x$, $SF_6$, $H_2$, MOX, HCHO, VOC, and HC). The disclosure includes, but is not limited to, the suitability for measuring the flow of GHG emissions that are emitted by, oil and gas facilities, industrial farming facilities, manufacturing facilities, waste management facilities, and high-density residential buildings/complexes.

BACKGROUND

There is a critical need for advanced GHG emission flowmeter technology that can continuously and accurately monitor, measure, and quantify GHG emissions at a low cost. It is crucial for a meter to be able to directly measure the mass flow rates of emissions, particularly when the emission source is at a distance from the flowmeter. This technology would significantly enhance the ability to monitor, quantify and manage emissions, contributing to more effective environmental protection, sustainability and compliance with the evolving regulatory standards for GHG emissions.

In industry, there are a variety of emission measurement devices that are currently in use, but none of them measure the mass flow rate and quantify emissions. In addition to this, there is currently no device that can directly measure emission mass flow rates from a distance. Existing devices either measure emissions directly at the source or estimate emission flow rates from afar using complex modeling based on emission concentration data. Moreover, many of these devices rely on sensor technologies that are adversely affected by environmental factors including but not limited to, fluctuating wind speeds and directions, humidity, and variations in ambient temperature and pressure. These limitations are very likely to result in inconsistent emission data and unreliable emission forecasts.

Commercialized emission measurement (monitoring) devices can be separated into two categories:

The first category of emission sensors focuses on measuring gas concentrations without directly assessing flow rates. These devices employ a variety of sensor technologies such as chemical, infrared, ultrasonic, photoionization, laser, optical, and thermal methods. Some devices in this category utilize a simplified simulation model to infer emission flow rates from changes in gas concentration data captured by the sensors. However, the flow rate estimations derived from these methods are largely conjectural, given the substantial assumptions inherent in the model and the susceptibility of the gas sensors to environmental factors which can impact their accuracy and measurement capabilities. Additionally, these devices are typically stationary, capturing emission data based on how emissions passively spread from their source to the sensor's location (as these devices do not possess an air intake system). This approach is not comprehensive or highly sensitive to total GHG emissions as it merely indicates the presence of emissions.

The second category of emission measurement devices combines a single-phase flowmeter with one or more gas sensors. The types of single-phase flowmeters used by the devices in this category, include thermal, turbine, optical, ultrasonic, or other similar meters. The gas sensor used can be any type listed in the first category such as chemical, infrared, ultrasonic, photoionization, laser, optical, and thermal methods. These devices are generally designed for inline measurement or measurement very close to the emission source and operate on the assumption that they capture all emissions. Along with the limitations of the gas sensors mentioned in the first category, these devices also assume the absence of moisture or other impurities in the gas flow, which can be a significant constraint.

Considering the limitations of the two categories described above, there is a crucial need for an emission flow measurement device that can directly measure and quantify emission mass flow rates at a distance from the emission source, while remaining unaffected by environmental variations to provide consistent emission data and reliable forecasts for emissions.

In order to increase the accuracy of emission mass flow rates calculated by the measurement device, a more accurate profile of the local wind direction and velocity can be used. Current anemometers have limitations in accuracy and adaptability to environmental extremes. Additionally, measurement of wind direction as a byproduct of smoke detection has its limitations. Specifically, this technology lacks the capability of continuous and real-time measurement of wind direction or wind velocity when the smoke is not present.

Considering the limitations associated with traditional anemometers, there is a essential need and pressing demand for innovative methods and technologies capable of measuring wind velocity and wind direction. This disclosure provides a solution that is highly adaptable and able to maintain precision across various environmental conditions, such as the presence of rain and pollutants.

BRIEF SUMMARY

An emission flowmeter system, and associated devices and methods of analyzing, measuring and quantifying emissions from a remote known source are described herein. While various references may be made to the flowmeter system or system, it is appreciated that this is not intended to be limiting and that the various systems and associated devices and methods of use are contemplated in each of the implementations and aspects described herein. Certain of these implementations include an emission flowmeter system featuring a multiphase mass flowmeter configured to measure sampled air such as total sampled air, which can encompass emissions and potentially include further measures such as of humidity and various airborne impurities, including Volatile Organic Compounds (VOCs). Additional relevant emissions include greenhouse gas (GHG) emissions, such as methane ($CH_4$), bromomethane ($CH_3BR$), ethane ($C_2H_6$), propane ($C_3H_8$), carbon oxides ($CO_x$), nitrogen oxides ($N_xO$), sulfur oxides ($SO_x$), sulfur flourides ($SF_6$), mixed oxides (MOX), formaldehyde (HCHO), and high hydrocarbons (HC). While the various implementations of an emission flowmeter system may utilize a dual pressure differential approach in its multiphase flowmeter, the disclosed system is not restricted to a particular multiphase technology for producing multiphase gas and VOCs mass flow measurements and other related measures.

The emission flowmeter system and associated devices and methods according to certain implementations can optionally be equipped with single or multiple gas sensors and single or multiple VOC sensor, designed to measure the concentration of emission gases and VOCs. These sensors can utilize a variety of technologies, including chemical, infrared, ultrasonic, photoionization, laser, optical, or thermal methods.

The emission flowmeter system according to certain implementations can optionally be equipped with an active air sample intake system, designed to draw in representative samples of emissions into the flowmeter's flow channel. This active air intake system, in some implementations, can have a 360 degree rotating inlet. This rotating inlet ensures air samples delivered to the rest of the emission flowmeter system are representative of the surrounding atmosphere. The inlet can, in some implementations, rotate about at least two axes, optionally perpendicular to one another. The rotational velocity of the inlet can provide further information for wind velocity and direction analysis, as is explained in the incorporated patent application with internal docket number 9020326/188602 by inventor Willow Liu et al.

The emission flowmeter system according to certain implementations can be configured to conduct a mass flow rate measurement of the total sampled ambient air, which includes emissions, potential humidity, and other airborne impurities including VOCs. Combined with gas concentration data from the gas sensor and VOC sensor, and known information of ambient wind velocity and direction, the device utilizes an advection diffusion analysis to deliver a comprehensive set of mass flow rate data for the gas emissions and VOC emissions at their source (which may be located a distance away from the flowmeter).

The emission flowmeter system according to certain implementations can be configured to directly measure mass emission flowrates from a remote known emission source. It solves the problem associated with inaccurate modeling of estimated emission flow rates from emission concentrations, or the problem associated with using single phase flowmeter to measure emission flowrates in a potentially multiphase environment, including humidity and airborne impurities.

The emission flowmeter system according to these implementations is therefore distinctly different from other existing and published devices, technologies and methods. The following aspects, either individually or combined, represent a non-exhaustive list of improvements represented by the various implementations described herein:

The emission flowmeter system or flowmeter system according to certain implementations does not depend on the passive drift of emissions from the emission source to the device. Instead, it employs an active air intake sampling system to transport emissions to the meter channel.

The emission flowmeter system according to certain implementations does not solely rely on emission concentration to estimate emission mass flow rates.

The emission flowmeter system according to certain implementations does not rely on the assumption that the ambient air is purely single-phase and devoid of humidity and airborne impurities.

The emission flowmeter system according to certain implementations does not rely on the assumption that it captures all emissions from the emission source. Instead, it combines detailed advection-diffusion analysis with known data on ambient wind velocity and direction to accurately measure emission flow rates at the remote known emission source.

The emission flowmeter system according to certain implementations directly measures the mass flow rates of emissions at the remote known emission source, rather than merely measuring volumetric flow rates and inferring mass flow rates based on an assumed constant emission density.

The emission flowmeter system according to certain implementations is simple, accurate with measurement stability and repeatability.

First, the active air intake sampling system draws a representative sample of ambient air into the channel of the emission flowmeter system. This emission flowmeter system then conducts a thorough analysis, yielding a mass flow rate estimate of the dry air, which includes gas emissions but excludes the effects of humidity and airborne impurities. The emission flowmeter system according to certain implementations also measures a mass flow rate of airborne impurities, which include VOCs. By combining these measurements with the emission concentration data from the gas sensor, and VOC sensor, the emission mass flow rate within the meter's channel is accurately determined. When this data is integrated with known ambient wind speed and direction, the location of the emission, and a detailed advection-diffusion analysis, the emission flowmeter system is able to precisely measure the gas emission mass flow rate and VOC emission mass flow rate at the remote source.

The disclosed emission flowmeter system, and associated devices and methods of analyzing, measuring, and quantifying emissions from a remote known source provides the continuous and accurate measurements of emission mass flow rates and cumulative emission mass over time.

It is an object of the disclosed emission flowmeter system to obviate or mitigate at least one disadvantage of previous methane measurement or monitoring devices.

In Example 1, an emission mass flowmeter system comprises a flow unit, comprising a multiphase mass flowmeter, and at least one sensor; and a main controller board in operational communication with the flow unit and a data source comprising known information, wherein the at least one sensor is configured to detect gas and/or VOCs emission concentrations, and the main controller board is configured to execute two or more PINNs to solve inverse nonlinear partial differential equations and establish an advection and diffusion equation based model to output emission mass flowrates which includes one or more gaseous emission mass flowrates and VOC mass flowrates.

Example 2 relates to the emission mass flowmeter system of Examples 1 and 3-6, wherein the flow unit further comprises an intake configured to flow a mixture of field sampled dry air comprising airborne moisture and airborne impurities into the multiphase mass flowmeter for calculation of individual mass flowrates.

Example 3 relates to the emission mass flowmeter system of Examples 1-2 and 4-6, wherein the main controller board is configured to calculate a mass flow rate contributed by emission advection and diffusion.

Example 4 relates to the emission mass flowmeter system of Examples 1-3 and 5-6, wherein the known information comprises wind velocity data, wind direction data and/or emission location data.

Example 5 relates to the emission mass flowmeter system of Examples 1-4 and 6, wherein the advection and diffusion equation-based model is configured to calculate, export and store outputs, comprising one or more of the gas emission mass flow rate, gas emission concentration, VOC emission mass flowrate, VOC emission concentration and humidity.

Example 6 relates to the emission mass flowmeter system of Examples 1-5, wherein the system is configured to establish a spatial perimeter for emission monitoring around the point of emission.

In Example 7, a method of determining emission mass flowrates comprises obtaining one or more mass flow rates using a flow cell comprising one or more multiphase mass flow meters configured to obtain the one or more mass flow rates, and one or more sensors; measuring one or more emission concentrations with the one or more sensors; inputting known information; inserting the one or more mass flow rates, one or more emission concentrations, and known information into an advection and diffusion equation-based model; and solving the advection and diffusion equation-based model using one or more PINN to produce a solution, wherein the solution to the advection and diffusion equation-based model gives an emission mass flow rate at the point of emission.

Example 8 relates to the emission mass flowmeter system of Examples 7 and 9-13, wherein the one or more mass flow rate comprise: a dry air mass flow rate; a moisture mass flow rate; and an airborne impurities mass flow rate.

Example 9 relates to the emission mass flowmeter system of Examples 7-8 and 10-13, wherein the one or more emission concentrations comprise gas emission concentration and VOC emission concentration.

Example 10 relates to the emission mass flowmeter system of Examples 7-9 and 11-13, wherein the known information comprises: a wind velocity; a wind direction; and a location of an emission source.

Example 11 relates to the emission mass flowmeter system of Examples 7-10 and 13, wherein two PINNs are used in solving the advection and diffusion equation.

Example 12 relates to the emission mass flowmeter system of Examples 7-11 and 13, wherein the two PINNs are an RPINN and an EPINN.

Example 13 relates to the emission mass flowmeter system of Examples 7-12, wherein the emission mass flow rate comprises: a gas emission concentration at the source of emission; a gas emission mass flow rate at the source of emission; a VOC emission concentration at the source of emission; and a VOC emission mass flow rate at the source of emission.

In Example 14, an emission mass flow meter system comprises a multiphase mass flowmeter; and at least one sensor; and one or more main controller boards in operational communication with the two or more flow units and a data source comprising known information, wherein: the at least one sensor of each of the two or more flow units is configured to detect gas and/or VOCs emission concentrations, and the main controller board is configured to execute one or more PINNs to solve inverse nonlinear partial differential equations and establish an advection and diffusion equation based model to output emission mass flowrates which includes one or more gaseous emission mass flowrates and VOC mass flowrates.

Example 15 relates to the emission mass flowmeter system of Examples 14 and 16-20, wherein the at least one sensor is a gas sensor or a VOC sensor.

Example 16 relates to the emission mass flowmeter system of Examples 14-15 and 17-20, wherein there are two PINNS.

Example 17 relates to the emission mass flowmeter system of Examples 14-16 and 18-20, wherein the two PINNS are an RPINN and an EPINN.

Example 18 relates to the emission mass flowmeter system of Examples 14-17 and 19-20, wherein the inverse nonlinear partial differential equations are a Difference Scheme.

Example 19 relates to the emission mass flowmeter system of Examples 14-18 and 20, wherein the known information comprises: wind velocity; wind direction; and a location of an emission source.

Example 20 relates to the emission mass flowmeter system of Examples 14-19, wherein the multiphase mass flowmeter measures a dry air mass flow rate, a moisture mass flow rate, and an airborne impurities mass flow rate.

The following parameters are defined for use in the equations that follow in this description:

C=the generalized emission concentration of either gas or VOCs $C_{GAS}$=the gas emission concentration $C_{VOC}$=the VOC emission concentration x, y, z=Cartesian three-dimensional location coordinates t=time C (x, y, z, t)=the generalized emission concentration at location coordinates (x, y, z) at time t, of either gas or VOCs U=the wind profile in the downwind (x) direction V=the wind profile in the downwind (y) direction W=the wind profile in the vertical downwind (z) direction $K_x$=the eddy diffusivity in the downwind (x) direction $K_y$=the eddy diffusivity in the downwind (y) direction $K_z$=the eddy diffusivity in the vertical downwind (z) direction S=the generalized source term or sink term of the emission of either gas or VOCs=generalized emission mass flowrate of either gas or VOCs $S_{GAS}$=the source term of sink term of the gas emission=gas emission mass flow rate $S_{VOC}$=the source term of sink term of the VOC emission=VOC emission mass flow rate X, Y, Z=the dimensions of the emission monitoring area P=pressure T=temperature DP=differential pressure Q=the mass flow rate of gas or VOC resulted from the emission's advection and diffusion activities $Q_{GAS}$=the mass flow rate of gas resulted from the emission's advection and diffusion activities $Q_{Moisture}$=mass flowrate of airborne moisture $Q_{Airborn\ Impurities}$=mass flowrate of airborne impurities $Q_{Field\ Sample\ Air}$=mass flowrate of field sample dry air (without moisture or impurities)

Phase Fraction=total gas volume fraction and/or relative humidity

N [C]=a nonlinear operator parametrized by the dimensions of emission monitoring area X, Y, Z $L_{tot}$=loss function Other aspects and features of the disclosed emission flowmeter system will become apparent to those ordinarily skilled in the art upon review of the following description of specific implementations in conjunction with the accompanying figures. Accordingly, the drawings and detailed description are to be regarded as illustrative in nature and not restrictive.

BRIEF DESCRIPTION OF THE DRAWINGS

Implementations of the disclosed emission flowmeter system will now be described, by way of example only, with reference to the attached figures.

DETAILED DESCRIPTION

The disclosed emission flowmeter system and associated devices and methods of use allow for the measurement and analysis of greenhouse gas emission in mass flowrates.

Figure 1:
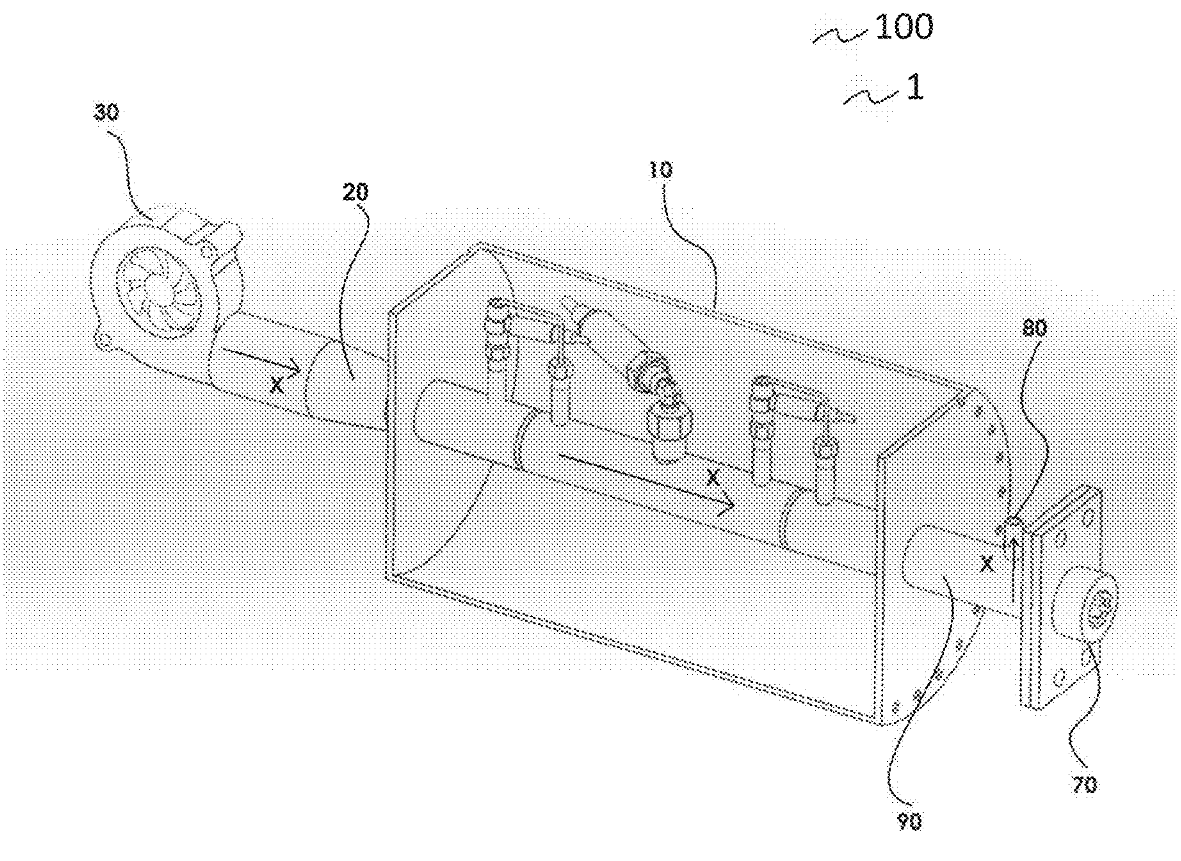
FIG. 1 is a diagrammatic view of an example emission flowmeter system with an active air intake, a multiphase mass flowmeter, and single or multiple gas analyzer(s), single or multiple VOCs.

FIG. 1 depicts an emission flowmeter system 100 according to one implementation. In this implementation, the emission flowmeter system 100 has a flow unit 1 comprising a multiphase mass flowmeter 10 disposed to measure flow along the direction of the flow (indicated by reference arrow X) and further components that can be installed in sequence, including for example an air intake apparatus 30, an inlet 60, a flow channel 90, an outlet segment 80, and at least one sensor 70. In various implementations, the air intake apparatus 30 can be a centrifugal fan, positive displacement blower, axial flow fan, or similar device that would be understood as equivalent to those skilled in the art. Similarly, the air intake apparatus 30 may be an active air inlet 20, such as in the incorporated patent application with internal docket number 9020326/188602 by inventor Willow Liu et al. As would be appreciated, these various components are all optional and can be omitted or substituted as required by the specific use case. It is further appreciated that these various components can be in sealed fluidic communication with one another as required to effectuate the described implementations.

Figure 2:
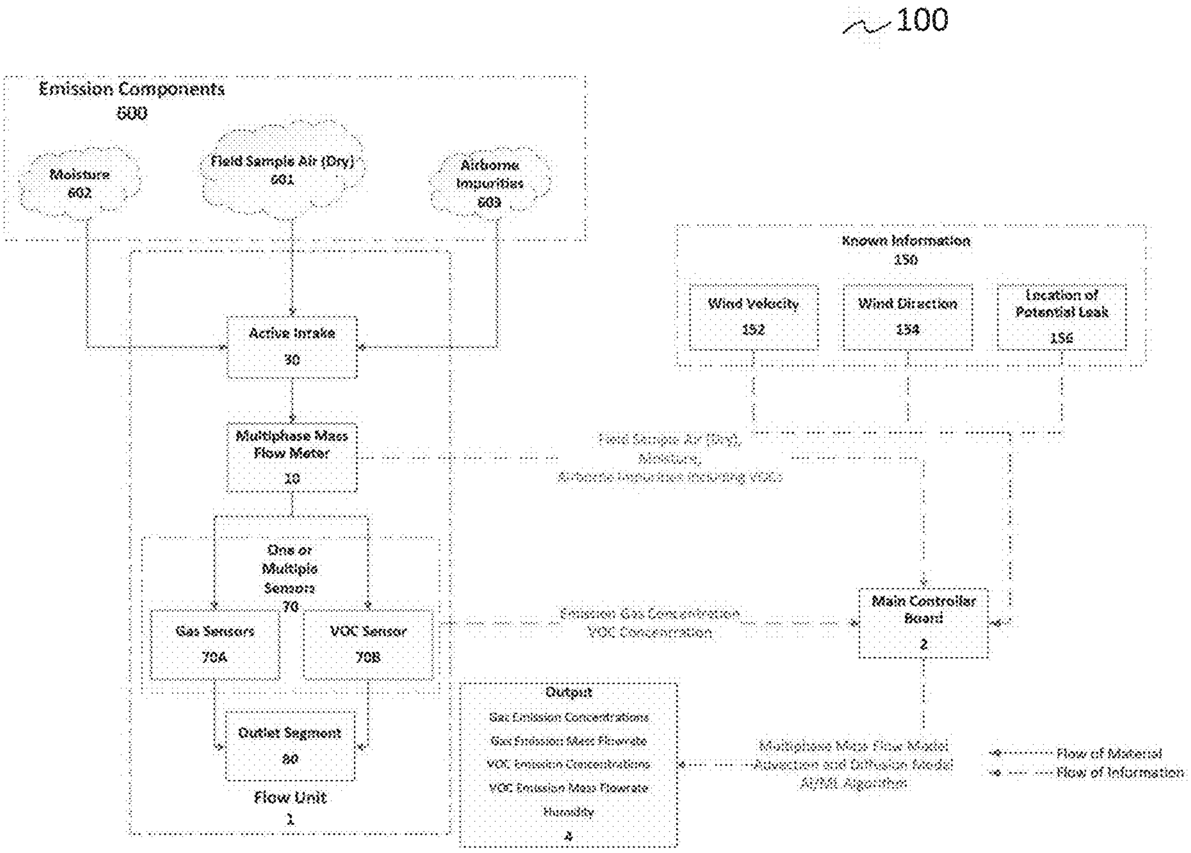
FIG. 2 shows the example of an emission flowmeter system with some example components that may be included.

As illustrated in FIG. 2, certain implementations of the emission flowmeter system 100 and flow unit 1 comprise an intake apparatus 30, a multiphase mass flowmeter 10, and at least one sensor 70 in fluidic communication with one another. In exemplary implementations, the at least one sensor 70 can optionally be one or more multiple gas sensors 70A, one or more VOC sensor(s) 70B, or other sensors 70. In such implementations, as would be understood, the one or more multiple gas sensors 70A can optionally be of chemical, infrared, ultrasonic, photoionization, laser, optical, and thermal sensors and the one or more VOC sensors can optionally be as chemical, infrared, ultrasonic, photoionization, laser, optical, and thermal sensors. These implementations further comprise a main controller board 2, comprising certain physical media, processing components, and I/O components so as to be configured to receive and process certain known information inputs 150 optionally including such input as wind velocity 152 and wind direction 154, one or more potential emission location(s) 156 and the like.

In various implementations, the main controller board 2 includes one or more computers that can be configured to perform particular operations or actions by virtue of having software, firmware, hardware, or a combination of them installed on the system that in operation causes or cause the system to perform the actions. Further, one or more computer programs can be configured to perform particular operations or actions by virtue of including instructions that, when executed by a data processing apparatus, cause the apparatus to perform the actions.

In some implementations, the wind velocity 152 and wind direction 154 are measured at a single point, such as by a single anemometer. In other implementations, the wind velocity 152 and wind direction 154 can be measured using the active air inlet, as discussed above. Further, the emission flowmeter system 100 and main controller board 2, according to implementations such as these, are configured to output an emission measurement dataset 4, including certain data including, for example, gas emission concentration $C_{GAS}$, gas emission mass flowrate $S_{GAS}$, VOC emission concentration $C_{VOC}$, VOC emission mass flowrate $S_{VOC}$, humidity H and other emission data as discussed and otherwise described herein.

Figure 3:
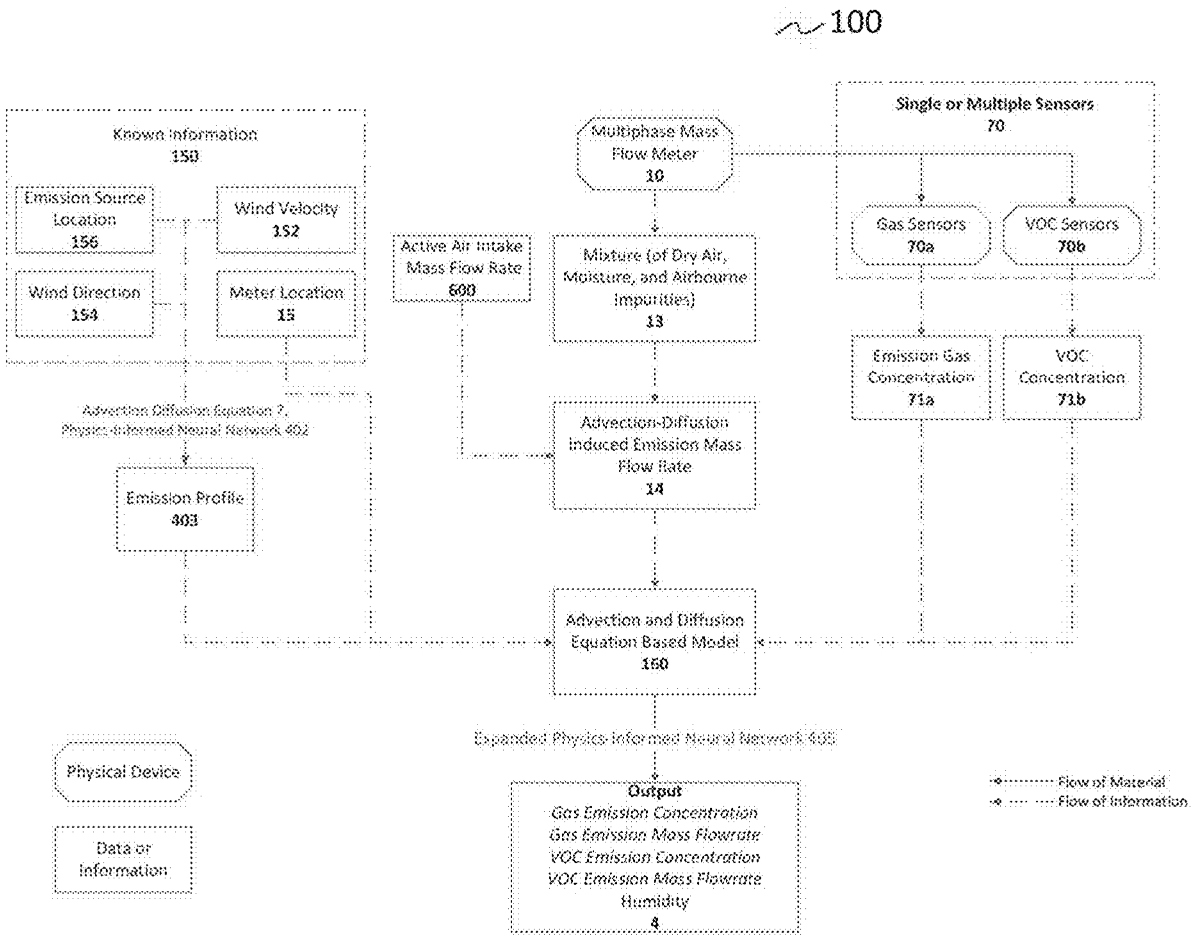
FIG. 3 shows the flow diagram of an example emission flowmeter system with its data processing methods.

FIG. 2 and FIG. 3 provide an example of the emission flowmeter system 100 in use according to certain implementations. In these implementations, a mixture 13 of various emission components, such as field sampled dry air 601, airborne moisture 602, and airborne impurities 603, was brought into the intake 30 of the emission flowmeter system 100.

According to various implementations, the mixture 13 of various emission components (shown in FIG. 2) passes through the multiphase mass flowmeter 10. The mixture 13, according to some implementations, can comprise individual flows of field sampled dry air 601, airborne moisture 602, and airborne impurities 603. The mass flowrate of the field sampled dry air flow 601 is given as $Q_{Field\ Sample\ Air}$. The mass flowrate of the moisture 602 given as $Q_{Moisture}$. The mass flowrate of the airborne impurities flow 603 given as $Q_{Airborn\ Impurities}$.

In some implementations, an advection-diffusion induced emission mass flow rate 14 can be calculated from the field sample air mass flow rate $Q_{Field\ Sample\ Air}$ and known active air intake mass flowrate 600, as shown in FIG. 3. The mixture 13 then passes the at least one sensor 70 to produce one or more measurements 71, which in this implementation utilizes a gas sensor 70A and a VOC sensor 70B, such that a particular emission gas concentration measurement 71A and VOC concentration measurement 71B can be measured. It is readily appreciated that further configurations of sensors 70 and additional measurements 71 can be utilized in alternate implementations.

In some implementations, the system 100 uses known information 150 which includes data such as wind velocity data 152, wind direction data 154 and emission location data 156 as inputs to an advection diffusion based model 160. As would be understood, various other kinds of data or information can be included as known information 150, as would be appreciated.

Combining the advection-diffusion induced emission mass flow rate 14, and measurements 71, such as the gas concentration measurements 71A, and VOC concentration measurements 71B, the emission flowmeter system 100 uses an advection and diffusion equation-based model 160 to calculate, export, and store outputs 4, including the Gas Emission Mass Flowrate $S_{GAS}$, GAS Emission Concentration $C_{GAS}$, VOC Emission Mass Flowrate $S_{VOC}$, VOC Emission Concentration $C_{VOC}$, and humidity.

Computational Overview

Throughout certain implementations of the system 100, two or more physics-informed neural networks (PINN) will be used as computational tool.

Turning to FIG. 3, various implementations include some or all of the following steps. As would be appreciated, this specific list or order of steps is illustrative, not exclusive, and could be modified by those skilled in the art. These steps are intended to give a general overview of one implementation of the computational logic employed in the system 100. A more detailed discussion is in the following sections.

The known information 150 contains the wind velocity 152, wind direction 154, and emission source location 156. From this information, a reduced PINN (RPINN) 402 (see FIG. 4A) can use the advection and diffusion equation 7 to create an emission profile 403, both of which will be discussed in more detail below. Meanwhile, the multiphase mass flow meter 10 outputs three mass flow rates of field sampled dry air 601, airborne moisture 602, and airborne impurities 603, which together form a mixture 13 of air and other minor components. These flow rates, along with the active air intake mass flow rate 600, are used as inputs into equation 2, which yields an advection-diffusion induced emission mass flow rate 14. The same mixture 13 also passes through, for example, gas sensors 70*a* and VOC sensors 70*b*, to give measurements 71 of emission gas concentration 71*a* and VOC concentration 71*b*.

The emission profile 403, the advection-diffusion induced emission mass flow rate 14, the emission gas concentration 71*a*, and the VOC concentration 71*b* all make up the advection and diffusion equation-based model 160, which takes the form of a Difference Scheme. To solve this Difference Scheme model, an expanded PINN (EPINN) 405 (see FIG. 4B) is used, which gives several outputs 4, which are calculated values such as gas emission concentration at the emission site, gas emission mass flow rate, VOC emission concentration at the emission site, and VOC emission mass flow rate. It is noteworthy that while all measurements were made remotely from the emission site, the outputs of the system 100 are local to the emission site.

Flow at the Meter

The steps below explain the method the emission flowmeter system 100 uses to measure emission mass flowrates at the meter, i.e. flow unit 1, location, according to one implementation. As would be appreciated, variations on these steps can be made.

When a mixture 13 of various emission components, such as dry air 601, airborne moisture 602, and airborne impurities 603, is brought into the flow unit 1 of the emission flowmeter system 100 via the air intake apparatus 30, the mixture 13 then passes through the multiphase mass flowmeter 10, and the following measurement calculations were performed:

$$Q_{Moisture} = f_1(DP, P, T, \text{Phase Fraction}) \tag{1}$$

$$Q_{Airborne\ Impurities} = f_2(DP, P, T, \text{Phase Fraction})$$

$$Q_{Field\ Sample\ Air(Dry)} = f_3(DP, P, T, \text{Phase Fraction})$$

Where $Q_{Field\ Sample\ Air(Dry)}$ is the mass flowrates of all dry sampled air, without any moisture or impurities.

As would be understood by those in the art, in implementations where the example calculations use readings of the differential pressure DP, pressure P and temperature T, the same calculation can be performed using different combinations of different sensors.

By knowing the total mass flowrate, given by the active air intake mass flowrate 600 $Q_{Active\ Intake}$, generated by the intake apparatus 30, one can determine the advection-diffusion induced emission gas mass flow rate $Q_{GAS}$ using the following equation.

$$Q_{GAS} = Q_{Field\ Sample\ Air(Dry)} - Q_{Active\ Intake} \tag{2}$$

The same mixture 13 air then passes through the sensor group 70 including gas sensor 70A and VOC sensor 70B, obtaining the gas emission concentration $C_{GAS}$ and VOC concentration $C_{VOC}$, which can be generalized as emission concentration at meter location $C_m$ $(x_m, y_m, Z_m, t)$.

The gas mass flowrate $Q_{GAS}$, and the airborne impurity mass flowrate $Q_{Airborne\ Impurities}$, and the emission concentration at meter location $C_m$ $(x_m, y_m, Z_m, t)$ are combined into an initial dataset that will be used for the emission mass release rate PINN algorithm, as will be discussed in more detail below.

Advection and Diffusion Equation Based Model

In certain implementations of the system 100, a spatial perimeter for emission monitoring is established around the point of emission, defined by its dimensions in three axes (X, Y, Z).

In these implementations, the location coordinates (x, y, z) are established within the emission monitoring perimeter, where the boundary conditions are defined as:

$$0 < x < X,\ 0 < y < Y,\ 0 < z < Z \tag{3}$$

As would be understood, while Cartesian coordinates are given in the specific implementation discussed, various other coordinate systems, such as spherical or polar, could be used. The emission location ($x_0$, $y_0$, $Z_0$) 156 is provided as known information or known information 150.

The gas emission rate SGAS or the VOC emission rate $S_{VOC}$ can be generalized as emission rate S at the emission location, as follows:

$$S = S(x_0, y_0, z_0) \tag{4}$$

The gas emission concentration $C_{GAS}$ or the VOC emission concentration $C_{VOC}$ can be generalized as emission concentration C at any location (x, y, z) at time t is $$C = C(x, y, z, t) \tag{5}$$

And at an initial condition $t=t_0$ is $$C(x, y, z, t_0) = C_0 \tag{6}$$

Provided as known information 150, U is the wind profile coefficient for terms in the x direction, V is the wind profile coefficient for terms in the y direction, and W is the wind profile coefficient for terms in the z direction.

Also provided as known information 150, $K_x$ is the eddy diffusivity coefficient for terms in the x direction, $K_y$ is the eddy diffusivity coefficient for terms in the y direction, and $K_z$ is the eddy diffusivity coefficient for terms in the z direction. The advection and diffusion equation 7 can be written as follows:

$$\frac{\partial C}{\partial t} + U\frac{\partial C}{\partial x} + V\frac{\partial C}{\partial y} + W\frac{\partial C}{\partial z} = \frac{\partial C}{\partial x}\left(K_x\frac{\partial C}{\partial x}\right) + \frac{\partial C}{\partial y}\left(K_y\frac{\partial C}{\partial y}\right) + \frac{\partial C}{\partial z}\left(K_z\frac{\partial C}{\partial z}\right) + S \tag{7}$$

where $$U\frac{\partial C}{\partial x} + V\frac{\partial C}{\partial y} + W\frac{\partial C}{\partial z}$$

represents the advection of emission along the three axis, and $$\frac{\partial C}{\partial x}\left(K_x\frac{\partial C}{\partial x}\right) + \frac{\partial C}{\partial y}\left(K_y\frac{\partial C}{\partial y}\right) + \frac{\partial C}{\partial z}\left(K_z\frac{\partial C}{\partial z}\right)$$

represents the diffusion along the three axis.

To express the advection and diffusion equation 7 in another way:

$$\frac{\partial C}{\partial t} + \text{advection} = \text{diffusion} + S. \tag{8}$$

To solve the equation numerically, each individual term involving partial differences must be reformulated into a Difference Scheme. As would be understood, other similar or functionally equivalent mathematical methods may be employed.

Difference Scheme

By employing the explicit finite difference scheme, the entire spatial monitoring area (X, Y, Z) is segmented into a grid of tiny cubic cells (Δx, Δy, Δz).

$$C^{n}_{i,j,k}$$

represents the emission concentration C at a location node marked at i on x axis, j on y axis, k on z axis, and at the n*Δt moment.

$$C^{n+1}_{i,j,k}$$

represents the emission concentration C at a location node marked at i on x axis, j on y axis, k on z axis, and at the (n+1)*Δt moment.

$$C^{n}_{i+1,j,k}$$

represents the emission concentration C at a location node marked at i+1 on x axis, j on y axis, k on z axis, and at the n*Δt moment.

$$C^{n}_{i-1,j,k}$$

represents the emission concentration C at a location node marked at i−1 on x axis, j on y axis, k on z axis, and at the n*Δt moment.

$$C^{n}_{i,j+1,k}$$

represents the emission concentration C at a location node marked at i on x axis, j+1 on y axis, k on z axis, and at the n*Δt moment.

$$C^{n}_{i,j-1,k}$$

represents the emission concentration C at a location node marked at i on x axis, j−1 on y axis, k on z axis, and at the n*Δt moment.

$$C^{n}_{i,j,k+1}$$

represents the emission concentration C at a location node marked at i on x axis, j on y axis, k+1 on z axis, and at the n*Δt moment.

$$C_{i,j,k-1}^{n}$$

represents the emission concentration C at a location node marked at i on x axis, j on y axis, k−1 on z axis, and at the n*Δt moment.

The explicit finite Difference Scheme of the emission concentration can be expressed as $$\frac{\partial C}{\partial t} \cong \frac{C_{i,j,k}^{n+1} - C_{i,j,k}^{n}}{\Delta t} \tag{9}$$

The central Difference Scheme is further used for the advection terms:

$$\frac{\partial C}{\partial x} \cong \frac{C_{i+1,j,k}^{n} - C_{i-1,j,k}^{n}}{2\Delta x} \tag{10}$$
$$\frac{\partial C}{\partial y} \cong \frac{C_{i,j+1,k}^{n} - C_{i,j-1,k}^{k}}{2\Delta y}$$
$$\frac{\partial C}{\partial z} \cong \frac{C_{i,j,k+1}^{n} - C_{i,j,k-1}^{n}}{2\Delta z}$$

The central Difference Scheme is also used for the diffusion terms:

$$\frac{\partial^2 C}{\partial x^2} \cong \frac{C_{i+1,j,k}^{n} - 2C_{i,j,k}^{n} + C_{i-1,j,k}^{n}}{2\Delta x} \tag{11}$$
$$\frac{\partial^2 C}{\partial y^2} \cong \frac{C_{i,j+1,k}^{n} - 2C_{i,j,k}^{n} + C_{i,j-1,k}^{n}}{2\Delta y}$$
$$\frac{\partial^2 C}{\partial z^2} \cong \frac{C_{i,j,k+1}^{n} - 2C_{i,j,k}^{n} + C_{i,j,k-1}^{n}}{2\Delta z}$$

Neural Network

The subsequent steps involve using a reduced PINN (RPINN) 402, a deep learning framework for solving the above inverse nonlinear partial differential equations, according to some implementations. Various implementations make use of the advection and diffusion equation 7 and an advection and diffusion profile 403, see FIG. 3, and other processes and steps as described herein.

Figure 4A:
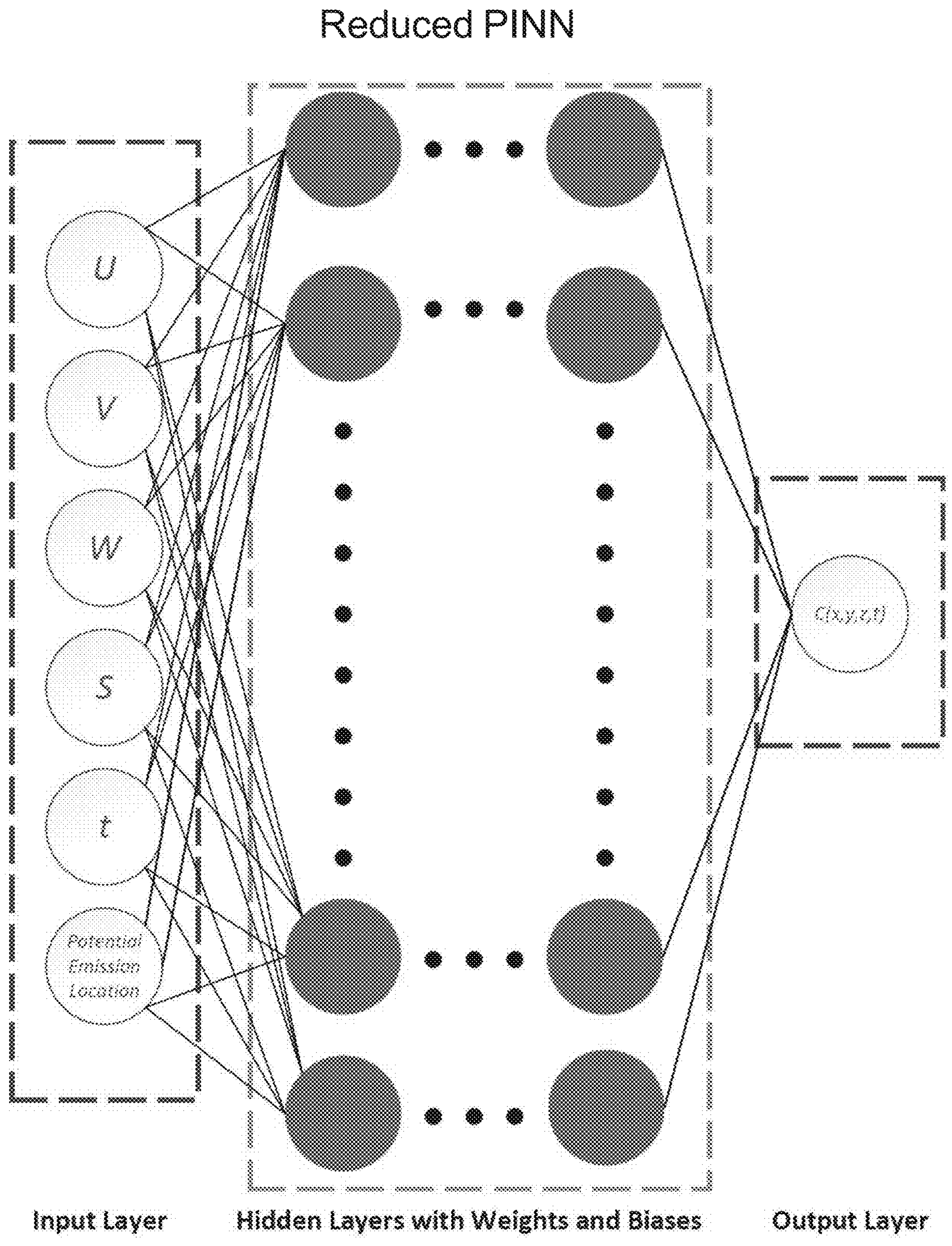
FIG. 4A illustrates the process of obtaining emission concentration from Physics-Informed Neural Network (PINN) trained wind profile and emission location information.
Figure 4B:
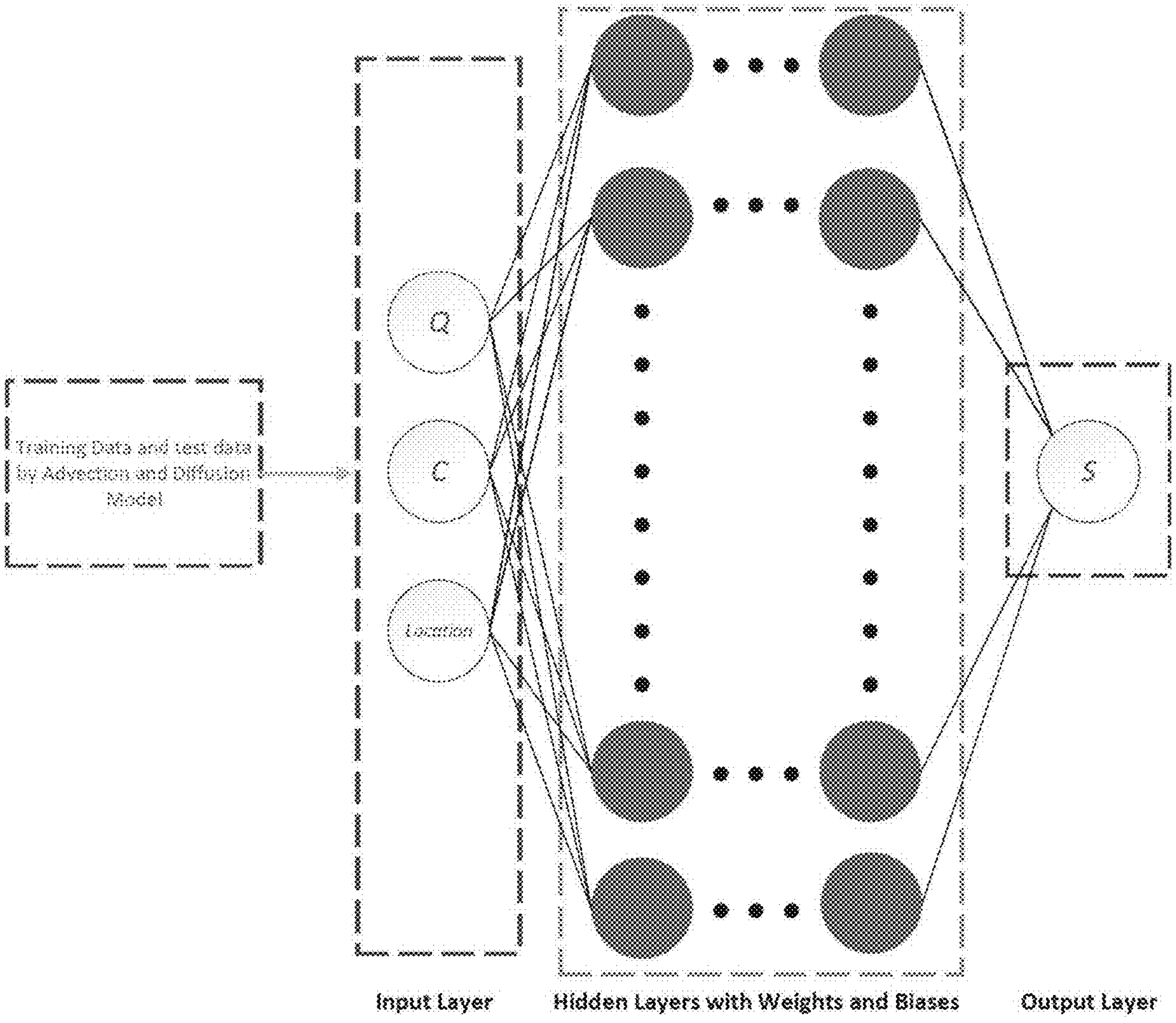
FIG. 4B illustrates the process of obtaining emission mass flowrates from PINN trained meter location, emission concentration and mass flowrates caused by emission advection and diffusion activities.

As illustrated in FIG. 4A, the disclosed system 100 simplifies the process of creating the advection diffusion equation based model 160. Rewriting the advection diffusion equation 7 as:

$$\frac{\partial C}{\partial t} + N[C] = 0 \tag{12}$$

where:

$$N[C] = U\frac{\partial C}{\partial x} + V\frac{\partial C}{\partial y} + W\frac{\partial C}{\partial z} - \tag{13}$$

-continued $$\frac{\partial C}{\partial x}\left(K_x\frac{\partial C}{\partial x}\right) - \frac{\partial C}{\partial y}\left(K_y\frac{\partial C}{\partial y}\right) - \frac{\partial C}{\partial z}\left(K_z\frac{\partial C}{\partial z}\right) - S$$

defining the residual f (x, y, z, t) as $$f = \frac{\partial C}{\partial t} + N[C] = 0 \tag{14}$$

And approximating C (x, y, z, t) by a deep neural network. This network can be differentiated using automatic differentiation. The parameters of f (x, y, z, t) and C(x, y, z, t) can be then learned by minimizing the following loss function $L_{tot}$.

$$L_{tot} = L_C + L_f \tag{15}$$

Where $L_C=\|C-c\|_\Gamma$ is the error between the PINN C(x, y, z, t), and the set of boundary conditions and measured data on the set of points Γ where the boundary conditions and data are defined, where c is the given noisy and incomplete measurement of the state of the system, and the set of boundary conditions and measured data on the set of points Γ where the boundary conditions and data are defined, and $L_f=\|f\|_\Gamma$ is the mean-squared error of the residual function. This second term encourages the PINN to learn the structural information expressed by the advection and diffusion equation during the training process. A further explanation of these steps is illustrated in FIG. 5, and detailed explanation provided herein.

Figure 5:
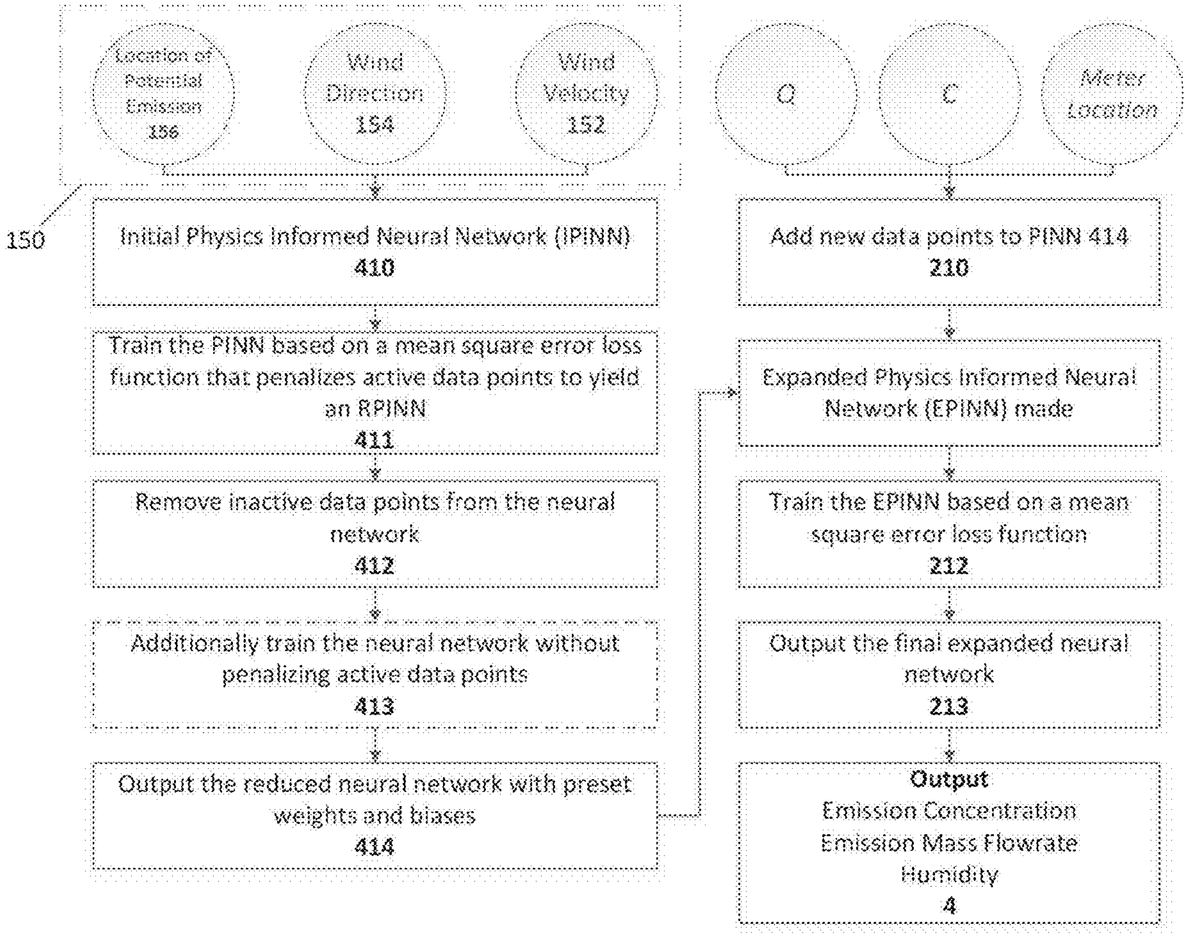
FIG. 5 The flow diagram of the reduced Physics-Informed Neural Network (RPINN) and expanded Physics-Informed Neural Network (EPINN) with their input, training and output processes.

FIG. 5 is a diagram of an example of processes for using an initial PINN (IPINN) (box 410) to generate a reduced PINN (RPINN) (box 411) to establish an advection diffusion equation based model 160. Furthermore, FIG. 5 also illustrates an example of processes of generating a final PINN algorithm (box 213) which leads to the eventual output of emission mass flowrates 2 from the emission flowmeter system. As would be understood, training a neural network, such as a PINN, involves the use of training data to allow for the tuning of weights and biases in the neural network.

In these implementations, the IPINN (box 410) was established from known information 150 such as was shown in FIG. 2, such as potential emission location(s) (box 156), wind velocity (box 152) and wind direction information (box 154) and the like.

Still in FIG. 5, the training engine for the RPINN 402 (box 411) is based on a mean square error loss function. Data points not meeting the criteria will be removed from the RPINN 402. Additionally, any data points that are not contributing to the RPINN 402 will be discarded (box 412). A further optional training engine based on mean square error loss function can be applied to the neural network without any penalization of data points (box 413). A final output of a RPINN 402 (box 414) is established, with a set of weights and biases to be saved for future use.

The RPINN 402 is further expanded to an expanded PINN (EPINN) 405 (box 211, and see FIG. 4B) via the input of new known information 150 (box 210) of added datapoints of known meter location information 15, multiphase mass measurements 71 and the gas sensor measurements 71, represented by the concentration C and mass flow rate Q. The EPINN 405, while retaining the preset weights and biases of reduced network (box 414), is trained by a mean square error loss function engine (box 212). A final EPINN 405 is established upon training.

This network enabled the output 4 of measurements from the emission flowmeter system including gas emission concentration, gas emission mass flowrate, VOC emission concentration, VOC emission mass flowrate and humidity.

FIGS. 6-10 depict various implementations of the system 100 wherein one or more flow units 1 are disposed in the field to identify emission location data 156.

Figure 6:
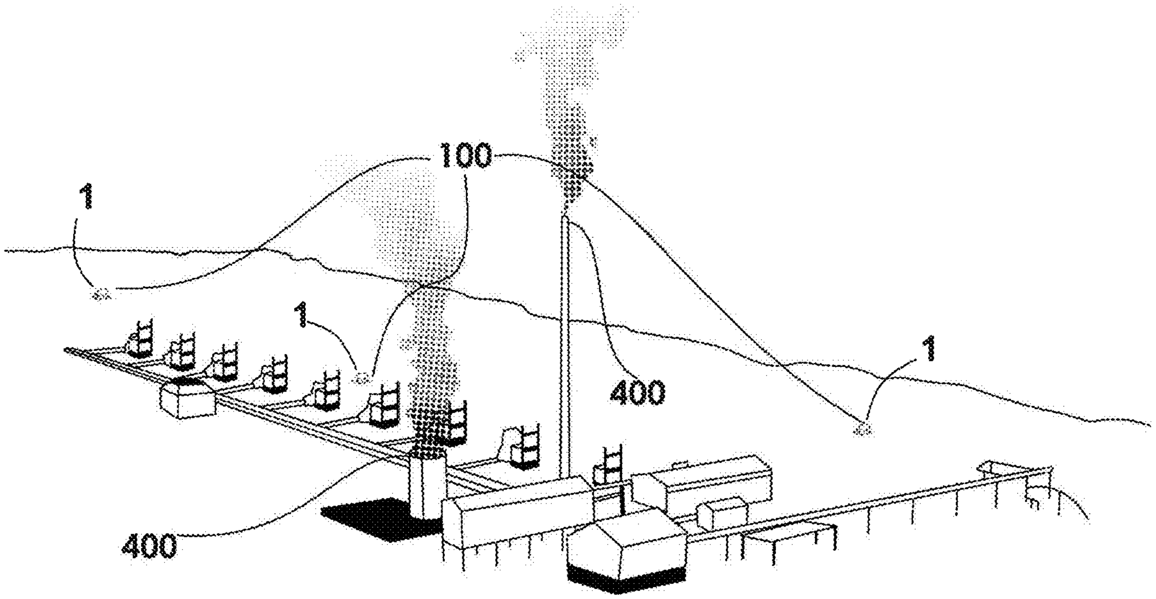
FIG. 6 is an illustration of example oilfield installation of a number of the emission flowmeter system, where a multiphase mixture of gaseous emissions, including combustion by-products and unburned hydrocarbons, humidity including water droplets and hydrocarbon liquids and airborne impurity such as ash particles is being sampled and measured.

FIG. 6 shows several flow units 1, making up one implementation of the emission flowmeter system 100, distributed around an industrial site with two emission sites 400.

Figure 7:
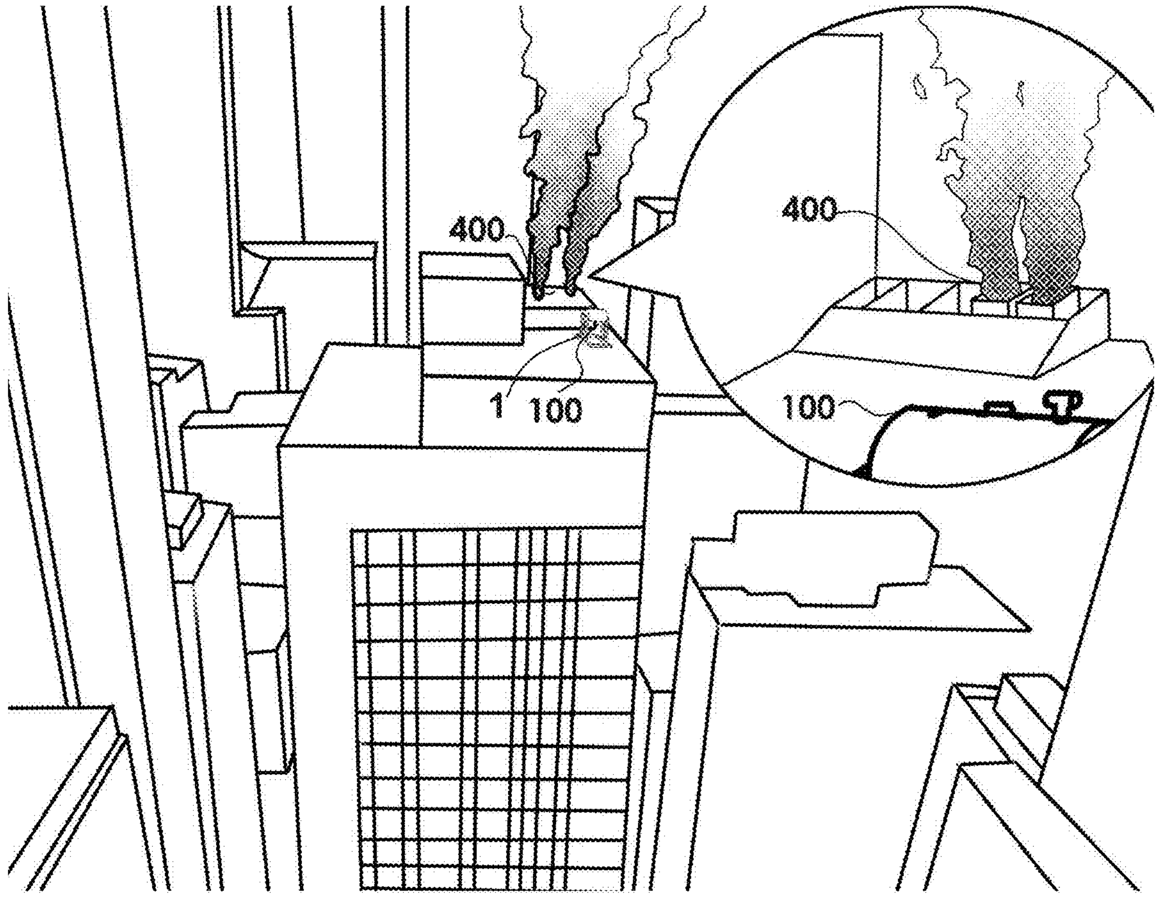
FIG. 7 is an illustration of example installation of an emission flowmeter system on top of a high-rise building, where a multiphase mixture of gaseous and humidity emissions from the HVAC and ventilation systems, and particulate matter from heating combustion processes and construction dust is being sampled and measured.

Similarly, FIG. 7 shows one flow unit 1, making up one implementation of the emission flowmeter system 100, installed near a difficult-to-reach emission site 400 located on the top of a high building.

Figure 8:
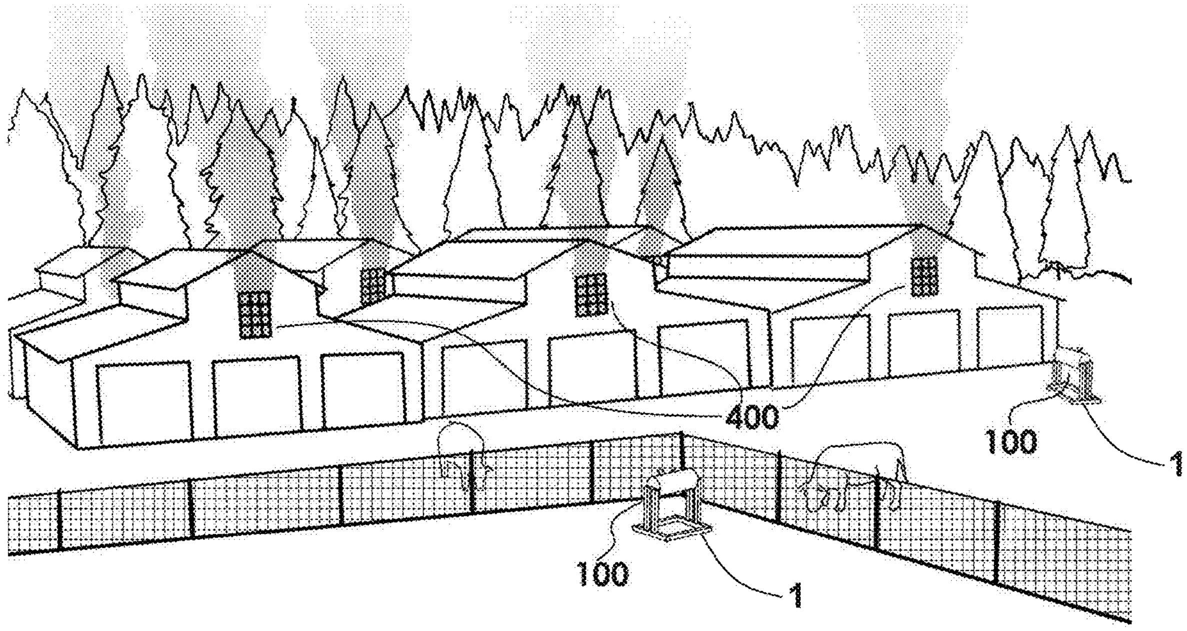
FIG. 8 is an illustration of example installation of a number of emission flowmeter systems outside of a cattle barn, where a multiphase mixture of gaseous emissions and dust is being sampled and measured.

FIG. 8 likewise shows two flow units 1, making up one implementation of the emission flowmeter system 100, installed in an agricultural setting with several emission sites 400.

Figure 9:
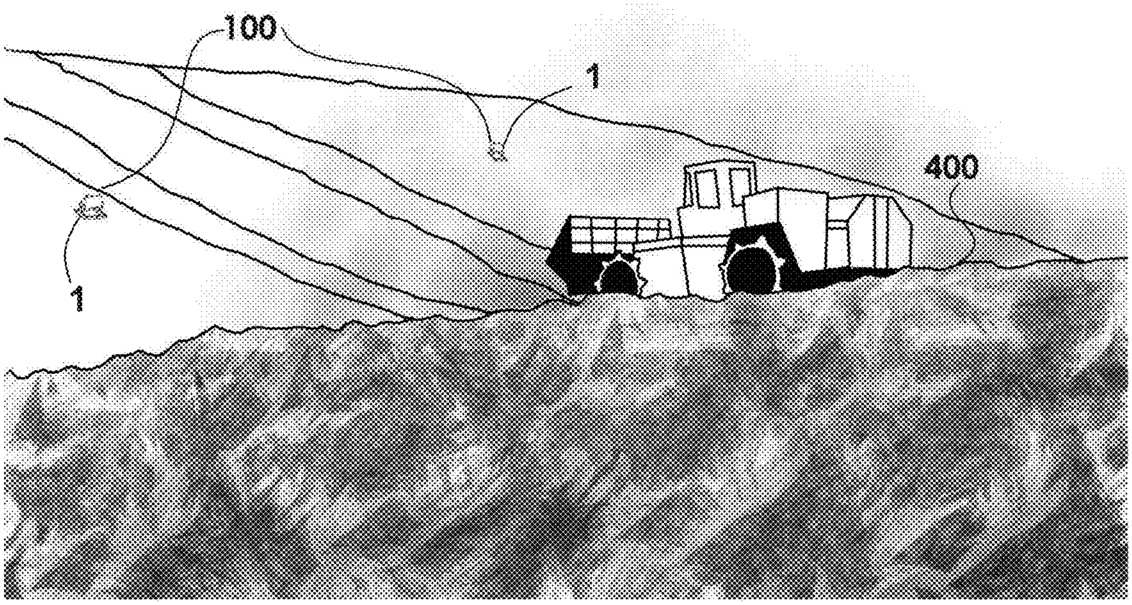
FIG. 9 is an illustration of example installation of a number of emission flowmeter systems around a landfill, where a multiphase mixture of gaseous emissions, vaporized leachate liquids and dust is being sampled and measured.

FIG. 9 shows several flow units 1, making up one implementation of the emission flowmeter system 100, installed in a mining application with a large, diffuse emission site 400.

Figure 10:
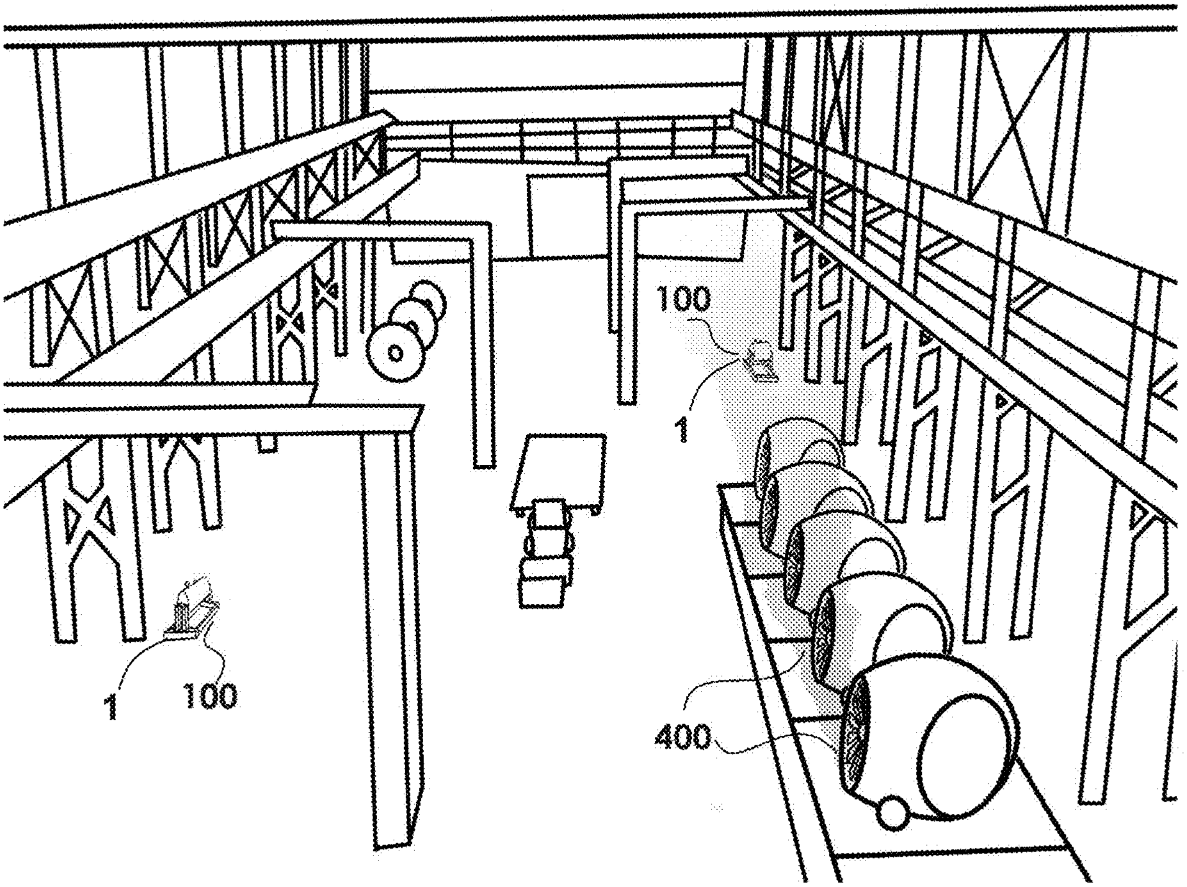
FIG. 10 is an illustration of example installation of a number of emission flowmeter systems on a confined factory floor, where a multiphase mixture of gaseous emissions such as GHG from chemical processes or burning fossil fuels, VOCs from chemicals, vaporized effluents and particulate matter from mechanical processes and combustion is being sampled and measured.

FIG. 10 is an illustration of example installation of a number of emission flowmeter systems on a confined factory floor, where a multiphase mixture of gaseous emissions such as GHG from chemical processes or burning fossil fuels, VOCs from chemicals, vaporized effluents and particulate matter from mechanical processes and combustion is being sampled and measured.

Although the disclosure has been described with reference to preferred implementations, persons skilled in the art will recognize that changes may be made in form and detail without departing from the spirit and scope of the disclosed systems, apparatus, and methods.

What is claimed is:

1. An emission mass flowmeter system, comprising:

a. a flow unit, comprising:

i. a multiphase mass flowmeter; and ii. at least one sensor; and b. a main controller board in operational communication with the flow unit and a data source comprising known information, wherein:

the at least one sensor is configured to detect gas and/or Volatile Organic Compounds (VOCs) emission concentrations, and the main controller board is configured to execute two or more physics-informed neural networks (PINNs) to solve inverse nonlinear partial differential equations and establish an advection and diffusion equation based model to output emission mass flowrates which includes one or more gaseous emission mass flowrates and VOC mass flowrates.

2. The system of claim 1, wherein the flow unit further comprises an intake configured to flow a mixture of field sampled dry air comprising airborne moisture and airborne impurities into the multiphase mass flowmeter for calculation of individual mass flowrates.

3. The system of claim 1, wherein the main controller board is configured to calculate a mass flow rate contributed by emission advection and diffusion.

4. The system of claim 1, wherein the known information comprises wind velocity data, wind direction data and/or emission location data.

5. The system of claim 1, wherein the advection and diffusion equation-based model is configured to calculate, export and store outputs, comprising one or more of the gas emission mass flow rate, gas emission concentration, VOC emission mass flowrate, VOC emission concentration and humidity.

6. The system of claim 1, wherein the system is configured to establish a spatial perimeter for emission monitoring around a point of emission.

7. A method of determining emission mass flowrates comprising:

obtaining one or more mass flow rates using a flow cell comprising:

i) one or more multiphase mass flow meters configured to obtain the one or more mass flow rates; and ii) one or more sensors;

measuring one or more emission concentrations with the one or more sensors;

inputting known information;

inserting the one or more mass flow rates, one or more emission concentrations, and known information into an advection and diffusion equation-based model; and solving the advection and diffusion equation-based model using one or more physics-informed neural networks (PINNs) to produce a solution, wherein the solution to the advection and diffusion equation-based model gives an emission mass flow rate at a point of emission.

8. The method of claim 7, wherein the one or more mass flow rate comprise:

a) a dry air mass flow rate;

b) a moisture mass flow rate; and c) an airborne impurities mass flow rate.

9. The method of claim 7, wherein the one or more emission concentrations comprise:

a) gas emission concentration; and b) VOC emission concentration.

10. The method of claim 7, wherein the known information comprises:

a) a wind velocity;

b) a wind direction; and c) one or more locations of an emission source.

11. The method of claim 7, wherein two PINNs are used in solving the advection and diffusion equation.

12. The method of claim 11, wherein the two PINNs are a reduced Physics-Informed Neural Network (RPINN) and an expanded Physics-Informed Neural Network (EPINN).

13. The method of claim 7, wherein the emission mass flow rate comprises:

a) a gas emission concentration at the source of emission;

b) a gas emission mass flow rate at the source of emission;

c) a VOC emission concentration at the source of emission; and d) a VOC emission mass flow rate at the source of emission.

14. An emission mass flow meter system comprising:

a. two or more flow units, each comprising:

i. a multiphase mass flowmeter; and ii. at least one sensor; and b. one or more main controller boards in operational communication with the two or more flow units and a data source comprising known information, wherein:

the at least one sensor of each of the two or more flow units is configured to detect gas and/or Volatile Organic Compounds (VOCs) emission concentrations, and the main controller board is configured to execute one or more physics-informed neural networks (PINNs) to solve inverse nonlinear partial differential equations and establish an advection and diffusion equation based model to output emission mass flowrates which includes one or more gaseous emission mass flowrates and VOC mass flowrates.

15. The emission mass flow meter system of claim 14, wherein the at least one sensor is a gas sensor or a VOC sensor.

16. The emission mass flow meter system of claim 14, wherein there are two PINNS.

17. The emission mass flow meter system of claim 14, wherein the two PINNs are a reduced Physics-Informed Neural Network (RPINN) and an expanded Physics-Informed Neural Network (EPINN).

18. The emission mass flow meter system of claim 14, wherein the inverse nonlinear partial differential equations are a Difference Scheme.

19. The emission mass flow meter system of claim 14, wherein the known information comprises:

a) wind velocity;

b) wind direction; and c) one or more locations of an emission source.

20. The emission mass flow meter system of claim 14, wherein the multiphase mass flowmeter measures a dry air mass flow rate, a moisture mass flow rate, and an airborne impurities mass flow rate.

* * * * *